US011861788B1

(12) United States Patent
Taghavi Nasrabadi et al.

(10) Patent No.: US 11,861,788 B1
(45) Date of Patent: Jan. 2, 2024

(54) RESOLUTION BUDGETING BY AREA FOR IMMERSIVE VIDEO RENDERING

(71) Applicant: Apple Inc., Cupertino, CA (US)

(72) Inventors: Afshin Taghavi Nasrabadi, Sunnyvale, CA (US); Maneli Noorkami, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 17/347,404

(22) Filed: Jun. 14, 2021

Related U.S. Application Data

(60) Provisional application No. 63/083,888, filed on Sep. 26, 2020.

(51) Int. Cl.
*G06T 15/08* (2011.01)
*G06T 7/50* (2017.01)
*G06T 9/00* (2006.01)

(52) U.S. Cl.
CPC ............... *G06T 15/08* (2013.01); *G06T 7/50* (2017.01); *G06T 9/00* (2013.01); *G06T 2207/10016* (2013.01)

(58) Field of Classification Search
CPC .. G06T 7/50; G06T 2207/10016; G06T 15/08
See application file for complete search history.

(56) References Cited

U.S. PATENT DOCUMENTS

| | | | | |
|---|---|---|---|---|
| 11,170,215 B1* | 11/2021 | Sieracki | ............... | G06K 9/6218 |
| 2012/0058823 A1* | 3/2012 | Minato | ............... | A63F 13/5252 |
| | | | | 463/32 |
| 2013/0300656 A1* | 11/2013 | Roegelein | ........... | G06F 11/3664 |
| | | | | 345/157 |
| 2013/0335416 A1* | 12/2013 | Coon | ...................... | G06T 19/20 |
| | | | | 345/423 |
| 2020/0045285 A1* | 2/2020 | Varerkar | .............. | H04N 19/597 |

\* cited by examiner

*Primary Examiner* — Matthew Salvucci
(74) *Attorney, Agent, or Firm* — Alexander A. Knapp; Kowert, Hood, Munyon, Rankin & Goetzel, P.C.

(57) ABSTRACT

One or more computing devices implement a mesh analysis for evaluating meshes to be rendered when rendering immersive content. The mesh analysis identifies objects in a three-dimensional scene and determines geometrical complexity values for the objects. Objects with similar geometrical complexities are grouped into areas and a mesh vertices budget is determined for the respective areas. Metadata indicating the area definitions and corresponding mesh vertices budgets are generated. The metadata may be uploaded to a server to simplify meshes in the scene prior to streaming to a client, or the metadata may be provided to a client for use in simplifying the meshes as part of rendering the scene.

20 Claims, 13 Drawing Sheets

*Atlas comprising packed attribute patch images for main views and non-redundant pixels of remaining views*

*Atlas comprising packed depth patch images for main views and non-redundant pixels of remaining views*

RESOLUTION BUDGETING BY AREA FOR IMMERSIVE VIDEO RENDERING

BACKGROUND

Priority Claim

This application claims benefit of priority to U.S. Provisional Application Ser. No. 63/083,888 entitled "Resolution Budgeting by Area for Immersive Video Rendering", filed Sep. 26, 2020, and which is incorporated herein by reference in its entirety.

TECHNICAL FIELD

This disclosure relates generally to rendering of volumetric visual content, such as content comprising attribute representations (e.g. colors) of a scene or object from multiple views and corresponding depth maps, as may be used in immersive videos, etc.

DESCRIPTION OF THE RELATED ART

Three-dimensional (3D) volumetric content may be generated using images captured by multiple cameras positioned at different camera angles and/or locations relative to an object or scene to be captured. The 3D volumetric content includes attribute information for the object or scene, such as color information (e.g. RGB values), texture information, intensity attributes, reflectivity attributes, or various other attributes. In some circumstances, additional attributes may be assigned, such as a time-stamp when the 3D volumetric content was captured. The 3D volumetric content also includes geometry information for the object or scene, such as depth values for surfaces of the object or depth values for items in the scene. Such 3D volumetric content may make up "immersive media" content, which in some cases may comprise a set of views each having associated spatial information (e.g. depth) and associated attributes. In some circumstances, 3D volumetric content may be generated, for example in software, as opposed to being captured by one or more cameras/sensors. In either case, such 3D volumetric content may include large amounts of data and may be costly and time-consuming to store and transmit.

SUMMARY OF EMBODIMENTS

In some embodiments, a system includes a computer readable medium storing program instructions. For example, the computer readable medium may store program instructions for implementing a streaming service or program instructions for implementing a client device, and may be executed by the one or more processors of a server of the streaming service or the client device.

The program instructions, when executed by one or more processors, cause the one or more processors to identify areas of a three-dimensional scene based on objects included within the scene, wherein the areas are identified based, at least in part, on varying levels of geometric complexity of the objects included within the scene. The program instructions also cause the one or more processors to determine, for each of the respective areas, a mesh vertices budget for objects included in the respective area, wherein a greater mesh vertices budget is allocated to one or more areas of the three-dimensional scene comprising more geometrically complex objects and a lesser mesh vertices budget is allocated to one or more other areas of the scene comprising less geometrically complex objects. Additionally, the program instructions cause the one or more processors to generate metadata for the three-dimensional scene. The metadata indicates the identified areas of the scene and respective mesh vertices budgets for each of the identified areas of the three-dimensional scene, wherein the mesh vertices budgets indicate a number of vertices to be used to render objects within the respective areas or a down-scaling factor to be applied to reduce a number of vertices used to render objects within the respective areas.

In some embodiments, a device comprises a memory storing program instructions and one or more processors. The program instructions, when executed on or across the one or more processors, cause the one or more processors to receive a bit stream for compressed visual volumetric content. The bit stream includes depth information (e.g. a depth map) for objects of a three-dimensional scene, attribute information (e.g. RGB values) for the objects of the three-dimensional scene, and metadata for the three-dimensional scene. The metadata indicates areas of the three-dimensional scene and respective mesh vertices budgets for each of the areas of the three-dimensional scene, wherein the mesh vertices budgets indicate a number of vertices to be used to render objects within the respective areas or a down-scaling factor to be applied to reduce a number of vertices used to render objects within the respective areas. The program instructions further cause the one or more processors to apply the mesh vertices budgets to the objects included in the respective areas to reduce respective numbers of vertices to be used to render the objects included in the respective areas and reconstruct the objects of the three-dimensional scene using the reduced respective numbers of vertices to render the objects as indicated in the metadata.

In some embodiments, mesh simplification based on area mesh vertices budgets may be performed at a source device (e.g. server), in which case the bit stream may include a simplified mesh that has already been simplified taking into account area mesh vertices budgets. Also, the bit stream may include associated attribute information for the simplified mesh.

Figure 1A:
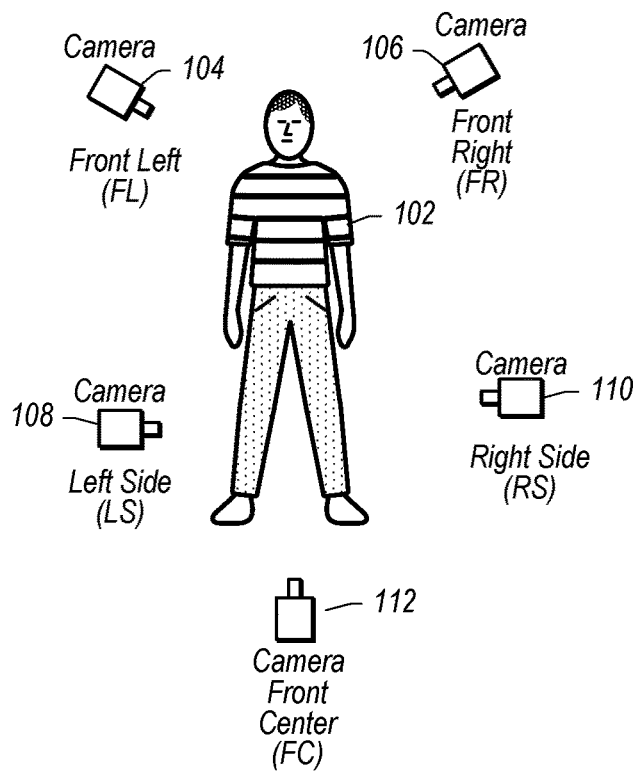
FIG. 1A illustrates a front view of a plurality of cameras located at different locations and/or camera angles relative to an object or scene, wherein the cameras capture images of the object or scene, and wherein the captured images are used to generate three-dimensional volumetric content representing the object or scene, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture three-dimensional (3D) volumetric content (also referred to herein as "visual volumetric content"), such as immersive video content, etc. has increased. Also, the development of advanced display technologies, such as virtual reality or augmented reality systems, has increased potential uses for 3D volumetric content, such as immersive video, etc. However, 3D volumetric content files are often very large and may be costly and time-consuming to store and transmit. For example, communication of 3D volumetric content, such as volumetric point cloud or immersive video content, over private or public networks, such as the Internet, may require considerable amounts of time and/or network resources, such that some uses of 3D volumetric content, such as real-time uses or on-demand uses, may be limited. Also, storage requirements of 3D volumetric content files may consume a significant amount of storage capacity of devices storing such files, which may also limit potential applications for using 3D volumetric content. Additionally, once transmitted 3D volumetric content may be computationally expensive to render. For example, meshes generated from depth maps included in a bit stream for compressed 3D volumetric content may require a large number of vertices to render.

In some embodiments, an encoder may be used to generate a compressed version of three-dimensional volumetric content to reduce costs and time associated with storing and transmitting large 3D volumetric content files. In some embodiments, a system may include an encoder that compresses attribute and/or spatial information of a volumetric point cloud or immersive video content file such that the file may be stored and transmitted more quickly than non-compressed volumetric content and in a manner such that the compressed volumetric content file may occupy less storage space than non-compressed volumetric content. In some embodiments, such compression may enable 3D volumetric content to be communicated over a network in real-time or in near real-time, or on-demand in response to demand from a consumer of the 3D volumetric content. Additionally, an encoder may generate metadata indicating vertices budgets to be applied to different areas of a scene, wherein the compressed 3D volumetric content represents the scene. Thus a rendering device may use the associated metadata to assign vertices budgets to different areas of the 3D volumetric content scene when rendering the scene. This may simplify the rendering process, as less vertices may be assigned to areas of the scene comprising less complex objects, while more vertices may be assigned to areas of the scene comprising more complex objects. Also, the burden of determining object complexity may be off-loaded to the encoder/source device (e.g. a server), wherein the rendering device (e.g. client) applies the already determined vertices budgets for the different areas of the scene as indicated in the metadata communicated with the 3D volumetric content.

In some embodiments, a system may include a decoder that receives encoded 3D volumetric content comprising video encoded attribute information and video encoded depth maps, along with metadata indicating mesh vertices budgets for areas of the 3D volumetric content via a network from a remote server or other storage device that stores or generates the volumetric content files. For example, a 3-D display, a holographic display, or a head-mounted display may be manipulated in real-time or near real-time to show different portions of a virtual world represented by 3D volumetric content. In order to update the 3-D display, the holographic display, or the head-mounted display, a system associated with the decoder may request data from the remote server based on user manipulations (or anticipated user manipulations) of the displays, and the data may be transmitted from the remote server to the decoder in a form of encoded 3D volumetric content (e.g. video encoded attribute patch images and video encoded depth maps). The displays may then be updated with updated data responsive to the user manipulations, such as updated views. For example, updated versions of the 3D volumetric content may be rendered on the displays, wherein the metadata indicating mesh vertices budgets for areas of the 3D volumetric content included in the bit stream are used by the rendering device to allocate vertices in the rendering process.

In some embodiments, sensors may capture attribute information for one or more points, such as color attributes, texture attributes, reflectivity attributes, velocity attributes, acceleration attributes, time attributes, modalities, and/or various other attributes. For example, in some embodiments, an immersive video capture system, such as that may follow MPEG immersive video (MIV) standards, may use a plurality of cameras to capture images of a scene or object from a plurality of viewing angles and/or locations and may further use these captured images to determine spatial information for points or surfaces of the object or scene, wherein the spatial information and attribute information is encoded using video-encoded attribute image patches and video-encoded depth maps accompanied with metadata indicating mesh vertices budgets for different areas of the 3D volumetric content, as described herein.

Generating 3D Volumetric Content

In some embodiments, 3D volumetric content that is to be encoded/compressed, as described herein, may be generated from a plurality of images of an object or scene representing multiple views of the object or scene, wherein additional camera metadata is known about the placement and orientation of the cameras that captured the multiple views.

For example, FIG. 1A illustrates an object (person 102) for which multiple images are being captured representing multiple views of the object, when viewed from cameras located at different locations and viewing angles relative to the object.

In FIG. 1A cameras 104, 106, 108, 110, and 112 view person 102 from different camera locations and/or viewing angles. For example, camera 112 captures a front center (FC) view of person 102, camera 108 captures a left side (LS) view of person 102, camera 110 captures a right side (RS) view of person 102, camera 104 captures a front left (FL) view of person 102, and camera 106 captures a front right (FR) view of person 102.

Figure 1B:
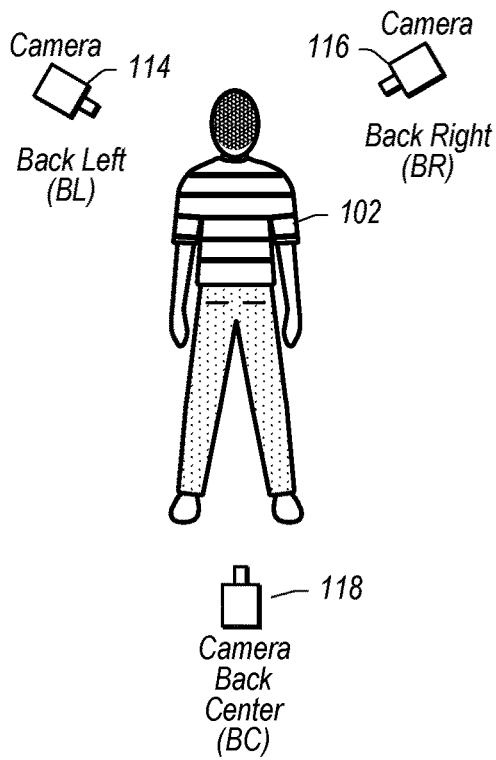
FIG. 1B illustrates a back view showing additional cameras located at different locations and/or camera angles relative to the object or scene, wherein the additional cameras capture images of the object or scene that are used to generate the three-dimensional volumetric content representing the object or scene, according to some embodiments.

FIG. 1B illustrates additional cameras that may be located behind person 102. For example, camera 118 captures a back center (BC) view of person 102, camera 114 captures a back left (BL) view of person 102, camera 116 captures a back right (BR) view of person 102, etc.

Figure 1C:
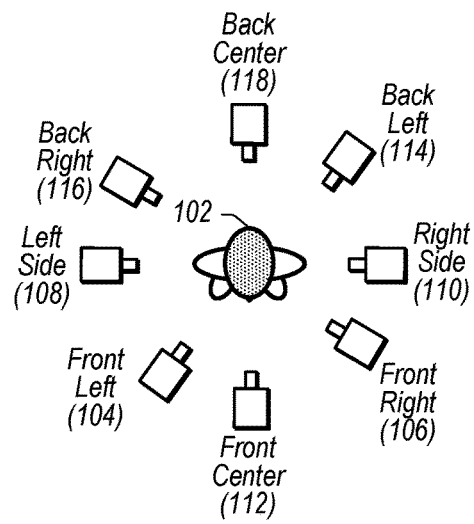
FIG. 1C illustrates a top view showing the cameras and the additional cameras located at the different locations and/or camera angles relative to the object or scene, wherein the cameras and the additional cameras capture the images of the object or scene that are used to generate the three-dimensional volumetric content representing the object or scene, according to some embodiments.

FIG. 1C is a top view illustrating the cameras shown in FIGS. 1A and 1B that are located at different locations and viewing angles relative to person 102. Note that the camera positions and camera angles shown in FIGS. 1A-1C are given as an example configuration and in some embodiments other camera configurations may be used. For example, in some embodiments, when capturing images for a scene, the cameras may face outward towards the scene as opposed to pointing inward towards an object, as shown in FIG. 1C. Also, in some embodiments, the cameras may not necessarily be arranged in a circular configuration, but may instead be arranged in other configurations, such as a square, rectangle, grid pattern, etc.

Figure 1D:
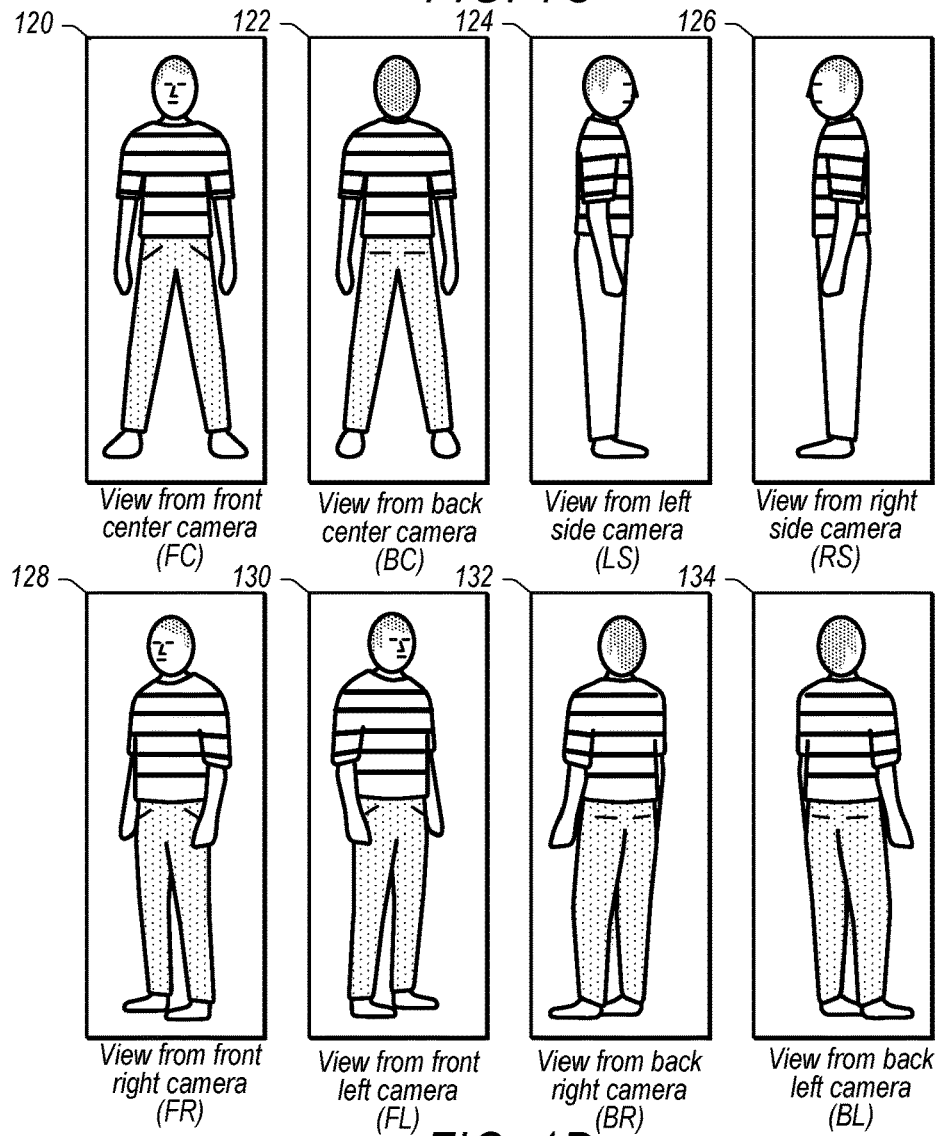
FIG. 1D illustrates respective views of the object or scene captured by the cameras and the additional cameras located at the different locations and/or camera angles relative to the object or scene, according to some embodiments.

FIG. 1D illustrates images that may have been captured via cameras 104-118 as shown in FIGS. 1C-1D. For example image 120 shows a front center (FC) view, image 122 shows a back center (BC) view, image 124 shows a left side (LS) view, image 126 shows a right side (RS) view, image 128 shows a front right (FR) view, image 130 shows a front left (FL) view, image 134 shows a back right (BR) view, and image 134 shows a back left (BL) view.

In some embodiments, camera metadata is associated with each of the views as shown in FIG. 1D, wherein the camera metadata (e.g. source camera parameters) indicate locations and camera angles for the respective cameras 104-118 that were used to capture images 120-134. In some embodiments, this camera metadata may be used to determine geometry information for the object or scene that is being captured by the respective cameras, such as X, Y, and Z coordinates of points of the object or scene (or other types of spatial information). In some embodiments, input data may have already been processed to determine geometry information, such as a depth map for each camera, as well as other attribute for each camera, such as colors, etc. For example, in such a case the input data may be pre-processed for depth estimation using multiple camera views.

Figure 2:
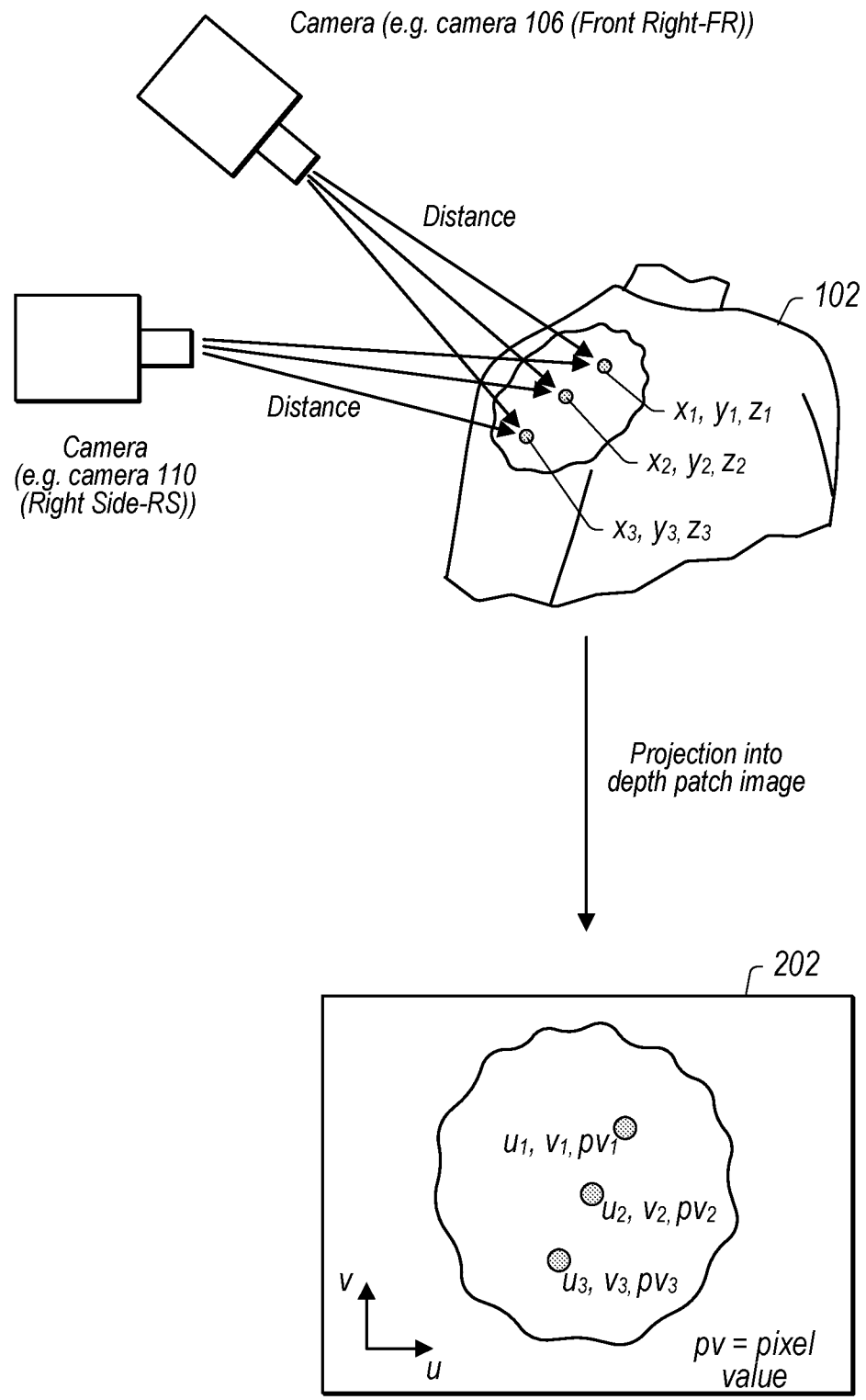
FIG. 2 illustrates depth values for a depth patch image being determined using camera location and camera angle information for multiple cameras that capture images for a same portion of the object or scene from the different locations and/or camera angles, according to some embodiments.

For example, FIG. 2 illustrates depth values for a depth patch image being determined using camera location and camera angle information for multiple cameras that capture images for a same portion of the object or scene from the different locations and/or camera angles, according to some embodiments.

For example, a component of an encoder, such as an atlas constructor may use source camera parameters (e.g. camera metadata indicating source camera parameters, such as camera location and orientation) along with the images captured from the cameras to determine distances to surfaces in the captured images from the cameras at the known locations with the known orientations. In turn, spatial information indicating locations in space for the surfaces may be determined using the determined distances from the cameras and the known locations and orientations of the cameras.

For example, source camera parameters may indicate locations and orientations for right side camera 110 and front right camera 106 that both capture images of a portion of a shoulder of person 102. Moreover, an atlas constructor may determine that the cameras 106 and 110 are both capturing images comprising a same surface of the object (e.g. the portion of the person's shoulder). For example, pixel value patterns in the images may be matched to determine that images from both cameras 106 and 110 are capturing the same portion of the person 102's shoulder. Using the source camera parameters and knowing points in the captured images that are located at a same location in 3D space, the atlas constructor may triangulate a location in 3D space of the matching portions of the captured images (e.g. the portion of person 102's shoulder). Based on this triangulation from the known locations and orientations of cameras 106 and 110, the atlas constructor may determine geometry/spatial information for the portion of the object, such as X, Y, and Z coordinates for points included in the matching portion of the person 102's shoulder as shown in FIG. 2.

Furthermore, the spatial/geometry information may be represented in the form of a depth map (also referred to herein as a depth patch image). For example, as shown in FIG. 2 the spatial information for the person's shoulder, e.g. points with coordinates $X_1, Y_1, Z_1; X_2, Y_2, Z_2;$ and $X_3, Y_3, Z_3$, may be projected onto a flat plane of a depth map, wherein the X and Y spatial information is represented by a location of a given point in the depth map 202. For example, X values may be represented by locations of the points along a width of the depth map 202 (e.g. the "U" direction) and Y values may be represented by locations of the points along the height of the depth map 202 (e.g. the "V" direction). Moreover, the Z values of the points may be represented by pixel values ("pv") associated with the points at locations (U,V). For example, a first point with coordinates in 3D space of $X_1, Y_1, Z_1$ may be represented in the depth map at pixel $(U_1, V_1)$ which has pixel value $pv_1$, wherein darker pixel values indicate lower Z values and lighter pixel values indicate greater Z values (or vice versa).

In some embodiments, depth maps may only be generated for views that are to be included in an atlas. For example, depth maps may not be generated for redundant views or redundant portions of views that are omitted from the atlas. Though, in some embodiments, image data and source camera parameters of all views may be used to generate the depth maps, but the redundant views may not be included in the generated depth maps. For example, whereas cameras 106 and 110 capture redundant information for the person 102's shoulder, a single depth map may be generated for the two views as opposed to generating two redundant depth maps for the person's shoulder. However the images captured from cameras 106 and 110 that redundantly view the person's shoulder from different locations/camera viewing angles may be used to determine the spatial information to be included in the single depth map representing the person's shoulder.

Figure 3:
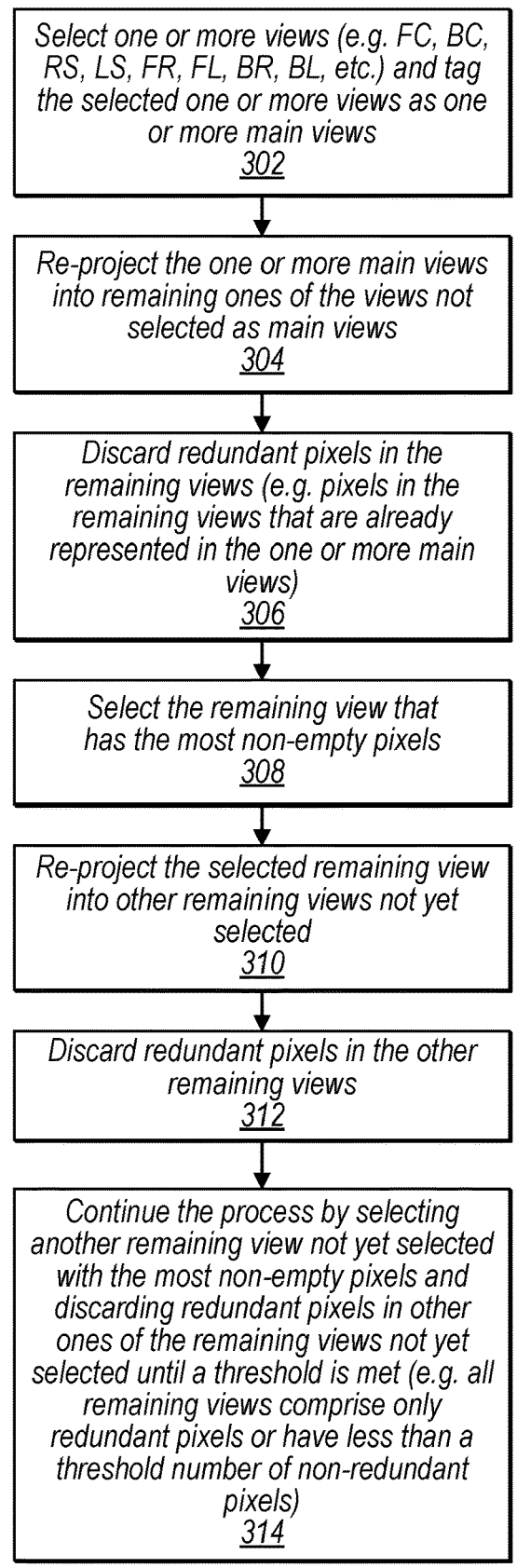
FIG. 3 illustrates a flowchart for an example process for generating an atlas from the captured views, wherein redundant information included in a given view already included in the atlas is omitted from other views that are to be included in the atlas, according to some embodiments.

FIG. 3 illustrates a flowchart for an example process for generating an atlas from the captured views, wherein redundant information already included in a given view already included in the atlas is omitted from other views that are to be included in the atlas, according to some embodiments.

At block 302, a view optimizer (such as a view optimizer of an encoder) receives source views comprising both attribute and depth information, such as source views comprising views 120-134 illustrated in FIG. 1D. The view optimizer also selects one of the received views as a main view. In some embodiments, the view optimizer may also receive source camera parameters which indicate locations and orientations of the cameras that captured the source views (e.g. camera metadata).

The view optimizer may select one or more main views and tag the selected views as main views. In order to determine a ranking (e.g. ordered list of the views) at block 304 the view optimizer then re-projects the selected one or more main views into remaining ones of the views that were not selected as main views. For example, the front center view (FC) 120 and the back center view (BC) 122 may be selected as main views and may be re-projected into the remaining views, such as views 124-134. At block 306, the view optimizer determines redundant pixels, e.g. pixels in the remaining views that match pixels of the main views that have been re-projected into the remaining views. For example, portions of front right view 128 are redundant with portions of front center view 120, when pixels of front right view 128 are re-projected into front center view 120. In the example, these redundant pixels are already included in the main view (e.g. view 120 from the front center (FC)) and are omitted from the remaining view (e.g. view 128 from the front right (FR)).

The view optimizer may iteratively repeat this process selecting a next remaining view as a "main view" for a subsequent iteration and repeat the process until no redundant pixels remain, or until a threshold number of iterations have been performed, or another threshold has been met, such as less than X redundant pixels, or less than Y total pixels, etc. For example, at block 308 the re-projection is performed using the selected remaining view as a "main view" to be re-projected into other ones of the remaining views that were not selected as "main views" for this iteration or a previous iteration. Also, at block 312 redundant pixels identified based on the re-projection performed at 310 are discarded. At block 314 the process (e.g. blocks 308-312) are repeated until a threshold is met (e.g. all remaining views comprise only redundant pixels or have less than a threshold number of non-redundant pixels, etc.). The threshold may be measured also be based on all of the remaining views having empty pixels (e.g. they have already been discarded) or all of the remaining views have less than a threshold number of non-empty pixels.

The ordered list of views having non-redundant information may be provided from the view optimizer to an atlas constructor of an encoder. Additionally, the source camera parameters (e.g. camera metadata) may be provided from the view optimizer to the atlas constructor.

The atlas constructor may prune the empty pixels from the respective views (e.g. the pixels for which redundant pixel values were discarded by the view optimizer). This may be referred to as "pruning" the views. The atlas constructor may further aggregate the pruned views into patches (such as attribute patch images and geometry patch images) and pack the patch images into respective image frames.

Figure 4:
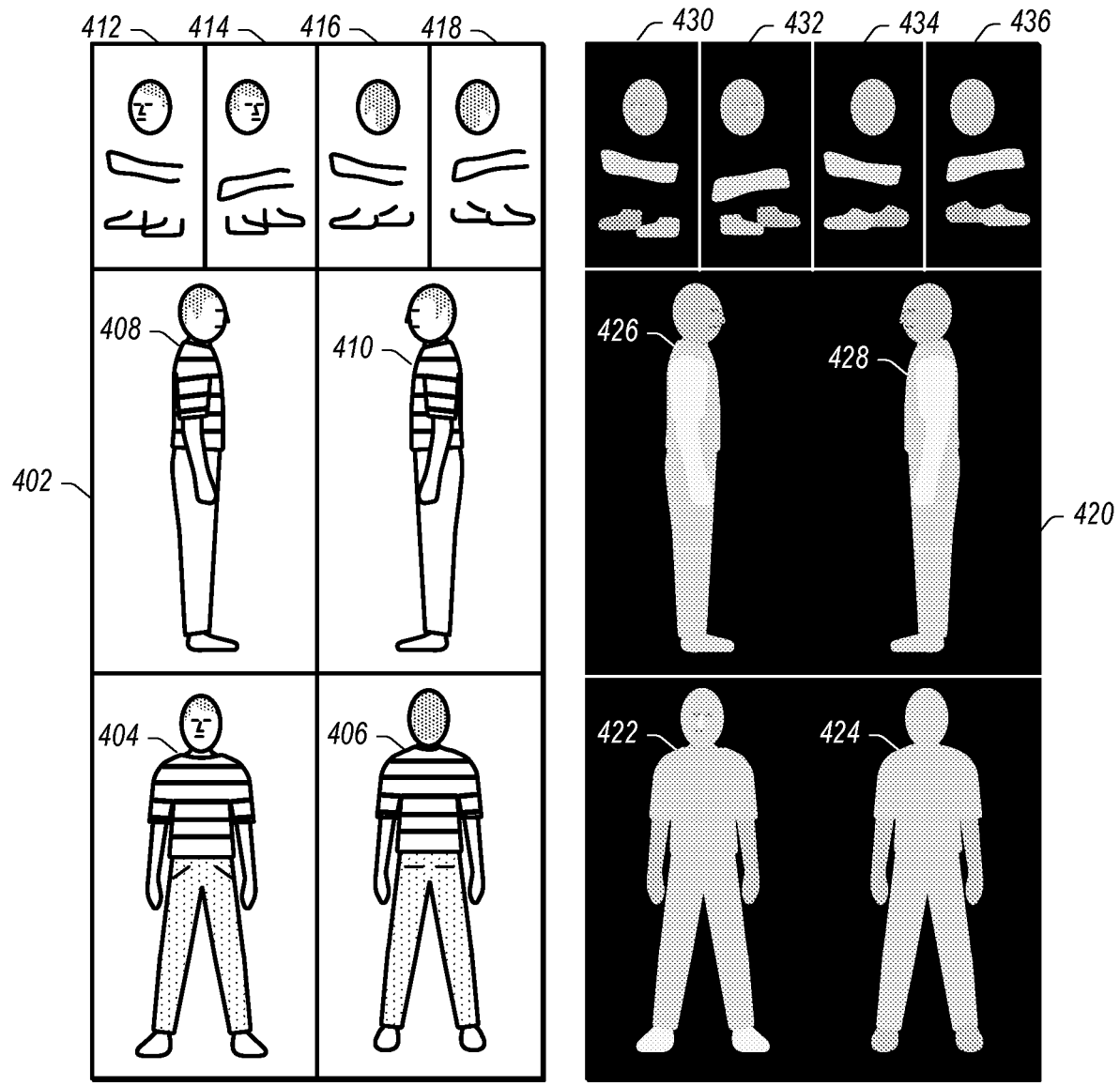
FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

For example, FIG. 4 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

Attribute patch images 404 and 406 for main views 120 and 122 are shown packed in the atlas 402. Also, patch images 408 and 410 comprising non-redundant pixels for views 124 and 126 are shown packed in atlas 402. Additionally, attribute patch images 412, 414, 416, and 418 comprising non-redundant pixels for remaining views 128, 130, 132, and 134 are shown packed in atlas 402.

Atlas 420/depth map 420 comprises corresponding depth patch images 422-436 that correspond to the attribute patch images 404-418 packed into attribute atlas 402.

As further described in regard to FIGS. 5-9C, the depth patch images 422-436 may be converted, at a decoder/renderer, into mesh-based representations and further simplified based on mesh budget metadata generated by the encoder and included in the bit stream. This may simplify rendering at a receiving device that is to render a reconstructed version of the object or scene, such as person 102. For example, if the depth patch images were encoded as a video image frame as shown in FIG. 4 (e.g. if atlas 420 was encoded as a video image), a rendering device converts the depth pixel values into point values in 3D space or covert the point values into meshes. However, often times a rendering device has limited computational capacity as compared to an encoding device (e.g. a server doing the encoding may have more computational capacity than a VR or AR device doing the rendering). Thus, generating the meshes and strategically simplifying the meshes at the decoding/rendering device using mesh budget metadata determined by the encoder may simplify the rendering process at the decoding/rendering device with limited computational capacity.

Resolution Budgeting by Area of a Scene

Volumetric visual content, such as immersive videos, provide up to six degree of freedom range for viewing. In some implementations meshes may be used to render immersive video content. However, rendering meshes may be compute intensive, especially for meshes comprising a large number of vertices. For example, rendering meshes with large numbers of vertices may slow down processing of an immersive video such that an acceptable frame rate cannot be maintained. In order to reduce the number of vertices in a scene, the scene may be uniformly down-sampled at a decoding device/rendering device. However, such an approach may result in a coarse mesh that introduces distortion and reduces quality.

In some embodiments, in order to simplify meshes used in a three-dimensional scene while maintaining a high-quality image for the three-dimensional scene, an adaptive down-sampling or mesh vertices budgeting process may be employed, wherein different down-sampling factors or different mesh vertices budgets are applied to different areas of a scene based on geometrical complexity of objects included in the respective areas, or based on object types of objects included in the respective areas. Such down-sampling factors or different mesh vertices budgets may be determined by an encoder and included in a bit stream as mesh budget metadata to be used by a decoder/rendering device when rendering the 3D scene.

In some embodiments, division of a scene into areas and allocations of down-sampling factors and/or mesh vertices budgets to the determined areas of the scene may be updated at fixed time intervals. For example, multiple frames of the scene may be encoded using the determined scene areas and associated down-sampling factors and/or mesh vertices budgets and after an amount of time has elapsed, the process of determining areas and associated down-sampling factors/mesh vertices budgets may be updated. In some situations the areas may change or remain the same when the updated areas and down-sampling and/or mesh vertices budgets are updated.

In some embodiments, objects in a scene may be identified using a machine learning or neural network. Furthermore, the machine learning algorithm or neural network may be able to classify the identified objects as being objects falling to particular object type categories, such as "person", "car", "tree", "wall", etc. Furthermore, a mesh analysis module may store complexity values for different types of objects. For example, a higher complexity value may be assigned to a "person" object type than is assigned to a "wall" object type.

Additionally, or alternatively, in some embodiments, objects in a scene may be reconstructed at an encoder and an object complexity value may be determined based on factors associated with reconstructing the object, such as a number of vertices used to reconstruct the object, an amount of processing resources used to reconstruct the object, an amount of time required to reconstruct the object, etc. These complexity values for different areas/objects may then be included as mesh budget metadata in an encoded bit stream generated by the encoder.

Objects with higher complexity values may be grouped into common areas that are allocated a higher mesh vertices budget and objects with lower complexity values may be grouped into common areas that are allocated a smaller mesh vertices budget. Said another way, objects with similar complexity scores may be grouped into common areas. In some embodiments, similarity in complexity scores of objects may be determined based on the objects having complexity scores that deviate from one another less than a threshold value. Thus, a scene may be reconstructed using a sufficient number of vertices to reconstruct objects with complex geometries, such that distortion is reduced. But, at the same time reconstruction of the scene may be less resource intense as compared to previous systems that did not apply a down-sampling factor or mesh vertices budget for areas. For example, instead of all objects being reconstructed using a same vertex or polygon rate (or density per block of pixels), fewer vertices (or pixels) may be used to reconstruct objects with less complex geometries, such as a wall.

In some embodiments, a mesh analysis module may perform a rate distortion optimization (RDO) process to optimize across various variables to determine parameters that reduce overhead and result in high quality rendering of the scene. For example, partitioning a scene into more areas may improve rendering quality but may add overhead costs to signal area definitions for each of the area and to signal associated mesh vertices budgets for each of the areas. In contrast having fewer areas may reduce overhead signaling costs but may negatively impact quality by including a more complex object in an area that does not have a sufficient mesh vertices budget to render the more complex object without distortion. Or, having fewer areas may reduce rendering efficiency by including less complex objects in a common area with more complex objects and assigning a higher mesh vertices budget than what is necessary to properly render the less complex objects. Thus, a rate distortion optimization process may iterate through different combinations of area divisions and mesh vertices budget allocations to determine an optimum or semi-optimum distribution of areas and mesh vertices budget allocations.

In some embodiments, such as patch-based compression schemes, area definitions and associated mesh vertices budgets and/or down sampling factors may be signaled in a header or other data structure and may apply for a group of pictures defining the scene or a group of frames defining the scene across multiple moments in time.

In some embodiments, area definitions may change over time and may be signaled in a header or frame. For example, if an object is moving across the scene, an area definition for an area that comprises the object may be updated to encompass the object as the object moves across the scene. In some embodiments, an area that encompasses a moving object may be determined based on the patch of the object, such that the area is defined to be large enough to encompass the object as the object moves across or within the scene.

In some embodiments, metadata comprising the determined areas and associated mesh vertices budgets and/or down-sampling factors may be provided to a server that simplifies the meshes prior to providing to a client. Also, in some embodiments, an attribute atlas and depth map may be provided to a client with metadata indicating area definitions and associated mesh vertices budgets and/or down-sampling factors. The client may then apply the mesh vertices budgets and/or down-sampling factors, when reconstructing the scene. Also, in some embodiments, a client may selectively apply the mesh vertices budgets and/or down-sampling factors based on available resources. For example, if sufficient resources are available, the client may forego down-sampling some or all of the textures associated with the attribute atlas, or simplifying the meshes generated from the depth map. However, if resources are constrained, the client may apply the mesh vertices budgets and/or down-sampling factors. In some embodiments, down-sampling may be applied differently for the depth map than for the texture. For example in some embodiments, a mesh vertices budget allocated for geometry information may require more down-sampling than is applied to a corresponding texture.

Note that while a scene may include objects in three-dimensional space, the objects can be grouped into areas of the scene when viewed from a viewing perspective from which the scene is to be rendered.

Figure 5:
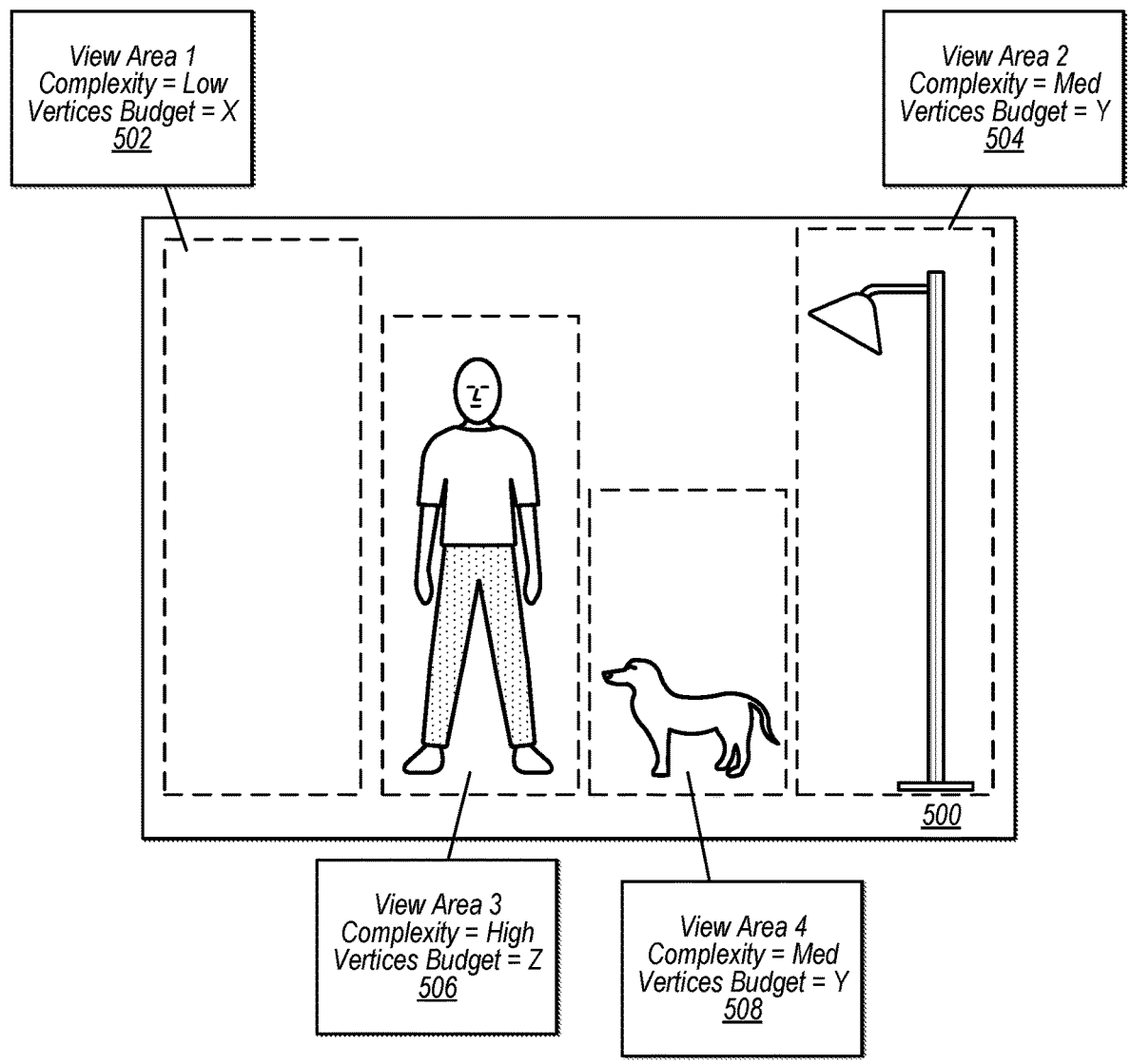
FIG. 5 illustrates a three-dimensional scene comprising different objects, wherein a mesh analysis modules has identified areas of the scene comprising objects with similar levels of complexity and has assigned vertices budgets to the respective areas for rendering the objects in the respective areas, according to some embodiments.

FIG. 5 illustrates a three-dimensional scene comprising different objects. A mesh analysis module on an encoder is used to identify areas of the scene comprising one or more objects with similar levels of complexity and has assigned vertices budgets to the respective areas for rendering the objects in the respective areas, according to some embodiments.

Scene 500 includes various objects having different geometric complexities. For example, scene 500 includes an open space in view area 1 (502), a lamp in view area 2 (504), a person in view area 3 (506), and a dog in view area 4 (508).

Figure 8:
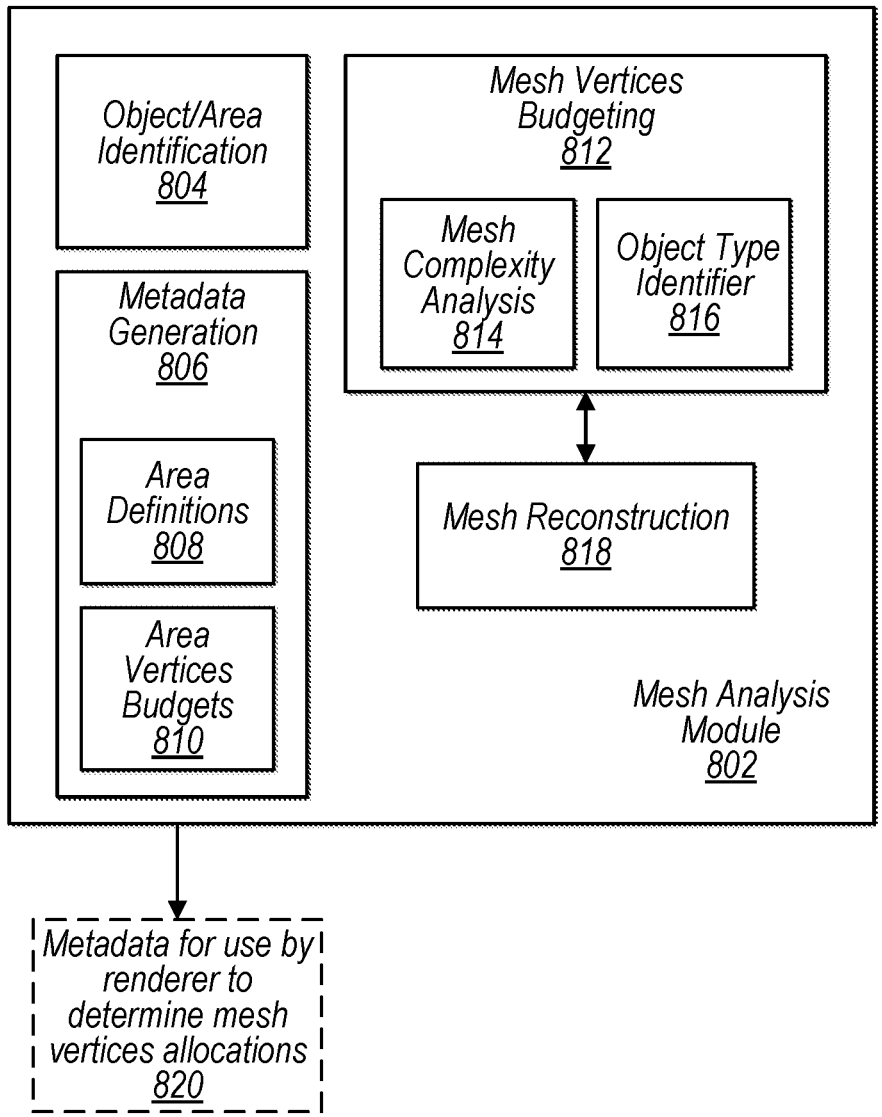
FIG. 8 illustrates components of a mesh analysis module, according to some embodiments.

In some embodiments, a mesh analysis module, such as mesh analysis module 802 illustrated in FIG. 8, may determine areas for scene 500, such as areas 1 through 4 based on the geometrical complexity of objects included in the scene. For example, the open space in view area 1 (502) has a low complexity and may be assigned a low mesh vertices budget. The lamp in view area 2 (504) may have a medium geometrical complexity and may be assigned a higher mesh vertices budget than the open space in view area 1 (502).

Also, the dog in view area 4 (508), may have a medium geometrical complexity and may be assigned a similar mesh vertices budget as the lamp in view area 2 (504). In some embodiments, view area 2 and view area 4 may be combined into a single view area with a common area definition and a shared mesh vertices budget. The person in view area 3 (506) may have a higher geometrical complexity than the open space, lamp, or dog and may be allocated a greater mesh vertices budget. In some embodiments, an area or sub-area with an associated mesh vertices budget/down sampling factor may correspond to an object in a scene, or may be smaller than an object in a scene. For example, in some embodiments, an area or sub-area may encompass a block of pixels in the atlas/depth map, such as an 8×8 block, or other suitable block size.

Figure 6:
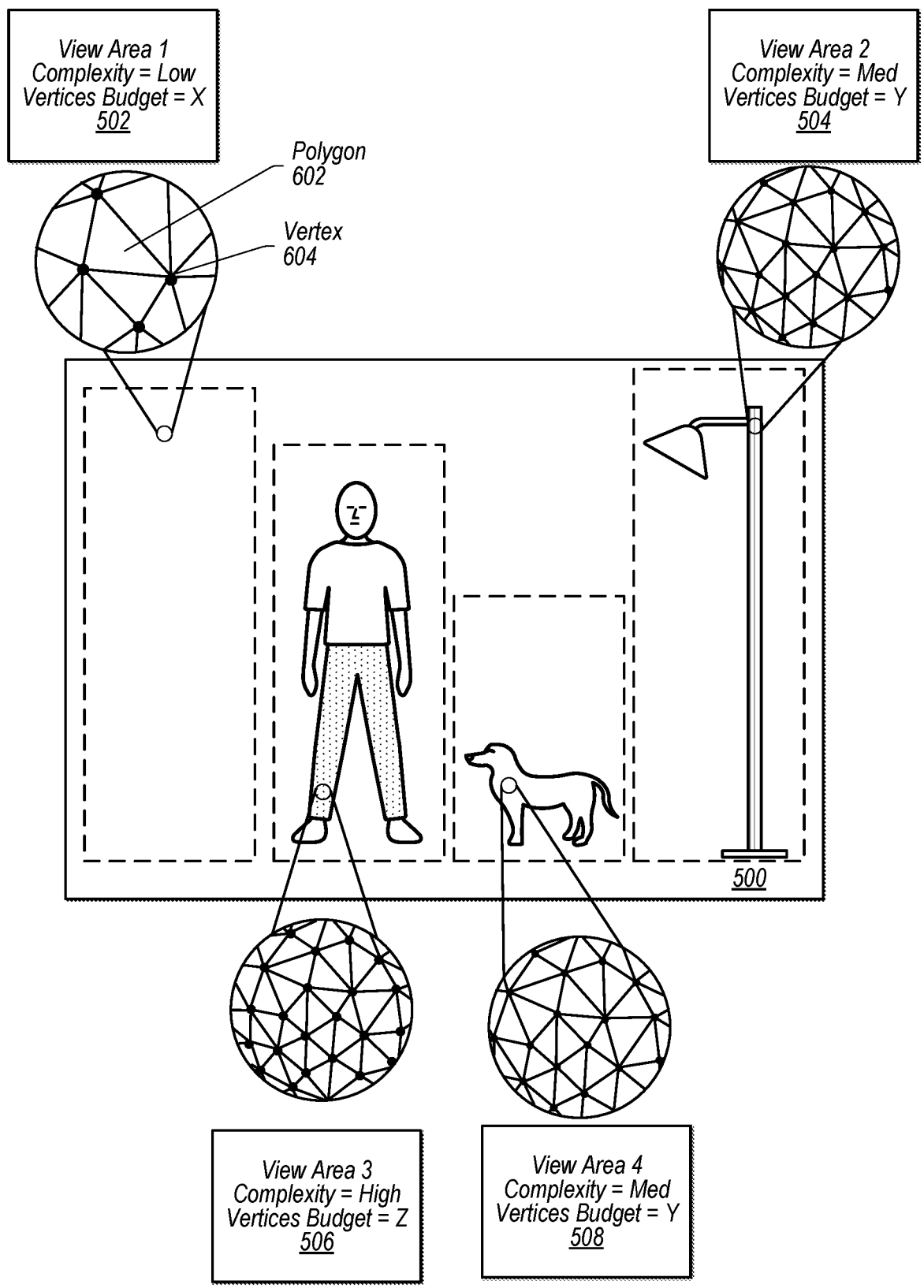
FIG. 6 illustrates the three-dimensional scene after being rendered according to the assigned vertices budgets, wherein some objects with less complex geometries are rendered using fewer vertices than other objects with more complex geometries, according to some embodiments.

FIG. 6 illustrates the three-dimensional scene after being rendered according to the assigned vertices budgets, wherein some objects with less complex geometries are rendered using fewer vertices than other objects with more complex geometries, according to some embodiments.

As can be seen in FIG. 6, the objects in scene 500 may be represented by meshes comprising vertices 604 that are connected to form polygons 602, such as triangles on a surface of the objects. As can be seen in FIG. 6, the person is allocated more vertices that result in smaller polygons and a finer grained surface than is the case for the other objects, such as the wall. Also, the lamp and dog are allocated more vertices than the wall, but fewer than the person.

Figure 7:
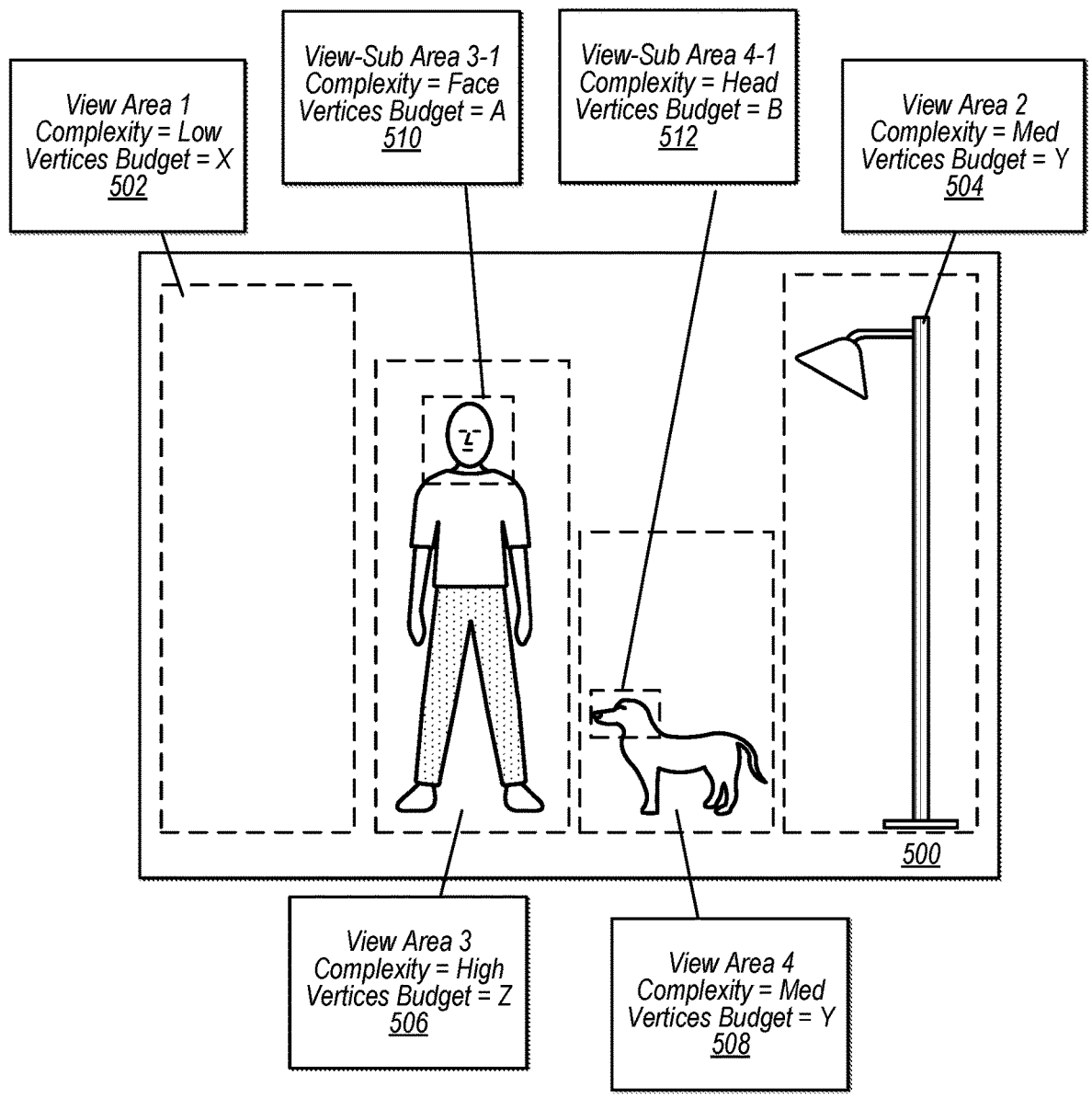
FIG. 7 illustrates a three-dimensional scene comprising different objects, wherein a mesh analysis module has identified areas and sub-areas of the scene and assigned vertices budgets to the respective areas and sub-areas, according to some embodiments.

FIG. 7 illustrates a three-dimensional scene comprising different objects, wherein a mesh analysis module has identified areas and sub-areas of the scene and assigned vertices budgets to the respective areas and sub-areas, according to some embodiments.

In some embodiments, sub-areas may be defined for portions of an area and different mesh vertices budgets may be allocated to the sub-areas. For example in FIG. 7 the face of the person is included in view sub-area 3-1 (510) and is allocated a different mesh vertices budget than is allocated for view area 3. Also, the head of the dog is included in view sub-area 4-1 (512) and is allocated a different mesh vertices budget than view area 4.

FIG. 8 illustrates components of a mesh analysis module, according to some embodiments. Mesh analysis module 802 includes object/area identification module 804, metadata generation module 806, mesh vertices budgeting module 812, and mesh reconstruction module 818.

In some embodiments, object/area identification module 804 identifies objects in a scene and determines area divisions of the scene that include objects with similar geometric complexities. Mesh vertices budgeting module 812 includes mesh complexity analysis module 814 and/or object type identifier module 816. Mesh complexity module 814 may determine a complexity of a mesh based on reconstruction the mesh via mesh reconstruction module 818, based on a number of vertices included in geometry patches (e.g. portions of a depth map) for the object, etc. Additionally, or alternatively, object type identifier module 816 may identify objects in a scene, for example using machine learning or a neural network and may further assign object type identifiers to the identified objects.

Metadata generation module 806 generates metadata comprising area definitions 808 and area vertices budgets 810, as were determined by object/area identification module 804 and mesh vertices budgeting module 812. Metadata generation module 806 provides metadata 820 for use by a renderer to determine mesh vertices budgets for objects falling within the defined areas. Also, in some embodiments, metadata 820 may be provided to a server that down-samples meshes of objects falling in the defined areas based on the corresponding mesh vertices budgets, before providing a bit stream with the simplified meshes to a client device.

Figure 9A:
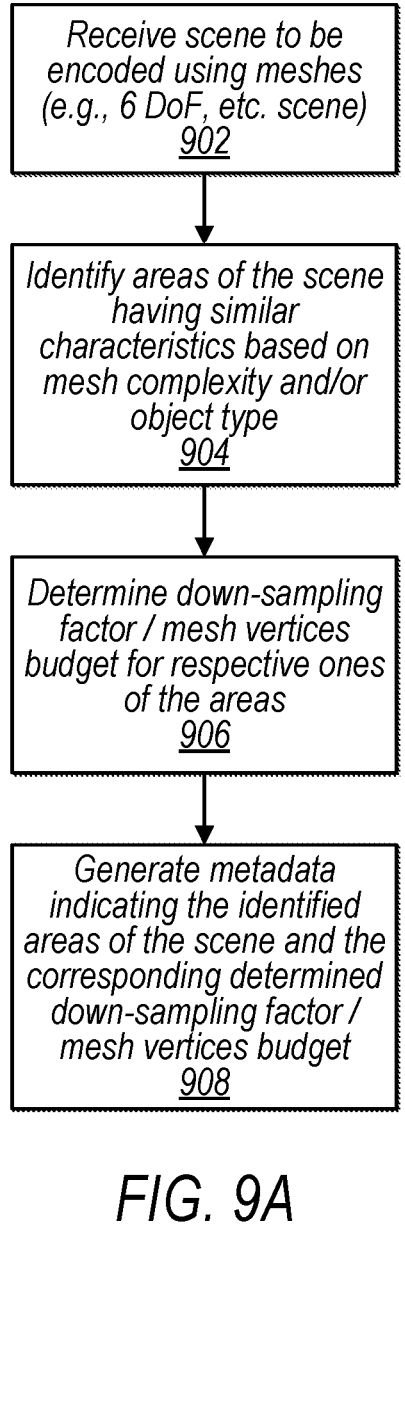
FIG. 9A illustrates a process of generating metadata comprising mesh vertices budgets for areas of a scene, according to some embodiments.

FIG. 9A illustrates a process of generating metadata comprising mesh vertices budgets for areas of a scene, according to some embodiments. At block 902, mesh analysis module, such as mesh analysis module 802, receives a scene to be encoded. At block 904, the mesh analysis module identifies areas of the scene having similar characteristics based on object geometrical complexity and/or object type. At block 906, the mesh analysis module determines down-sampling factors and/or mesh vertices budgets to be applied to objects located in the defined areas. At block 908, the mesh analysis module generates metadata indicating the identified areas of the scene and corresponding down-sampling factors and/or mesh vertices budgets for the areas.

Figure 9B:
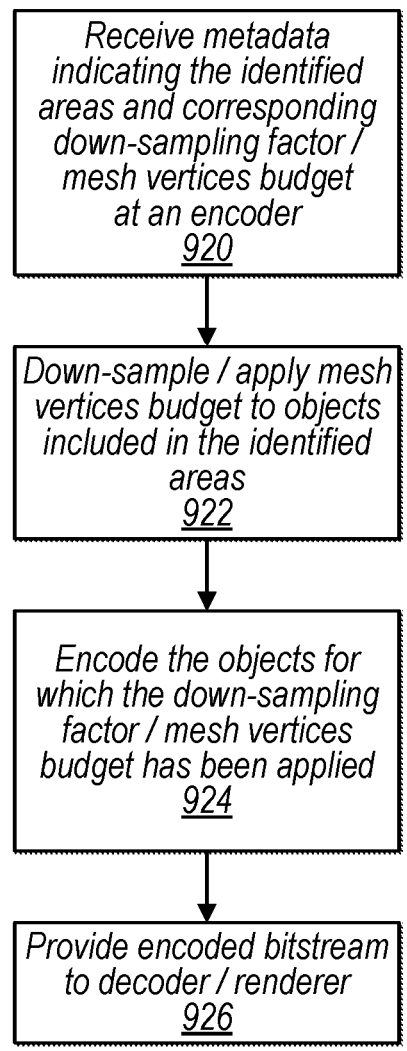
FIG. 9B illustrates a process of simplifying a scene based on mesh vertices budgets and/or generating a bit stream representing the scene, according to some embodiments.

FIG. 9B illustrates a process of simplifying a scene based on mesh vertices budgets and/or generating a bit stream representing the scene, according to some embodiments. At block 920, an encoded mesh providing device, such as server, encoder, etc. receives metadata indicating the identified areas of the scene and down-sampling factors and/or mesh vertices budgets for the areas. At block 922, the encoded mesh providing device (e.g. server, encoder, etc.) applies to the down-sampling factors and/or enforces the mesh vertices budgets to simplify meshes representing objects in the different areas of the scene.

At block 924, the encoded mesh providing device (e.g. server, encoder, etc.) encodes the objects for which the down-sampling factor and/or mesh vertices budget has been applied. At block 926, the encoded mesh providing device (e.g. server, encoder, etc.) provides an encoded bit stream to a an encoded mesh receiving device, such as a client device, renderer, decoder, etc., wherein the encoded bit stream includes data for reconstructing the simplified meshes that have been down-sampled and/or simplified by applying the mesh vertices budgets.

Figure 9C:
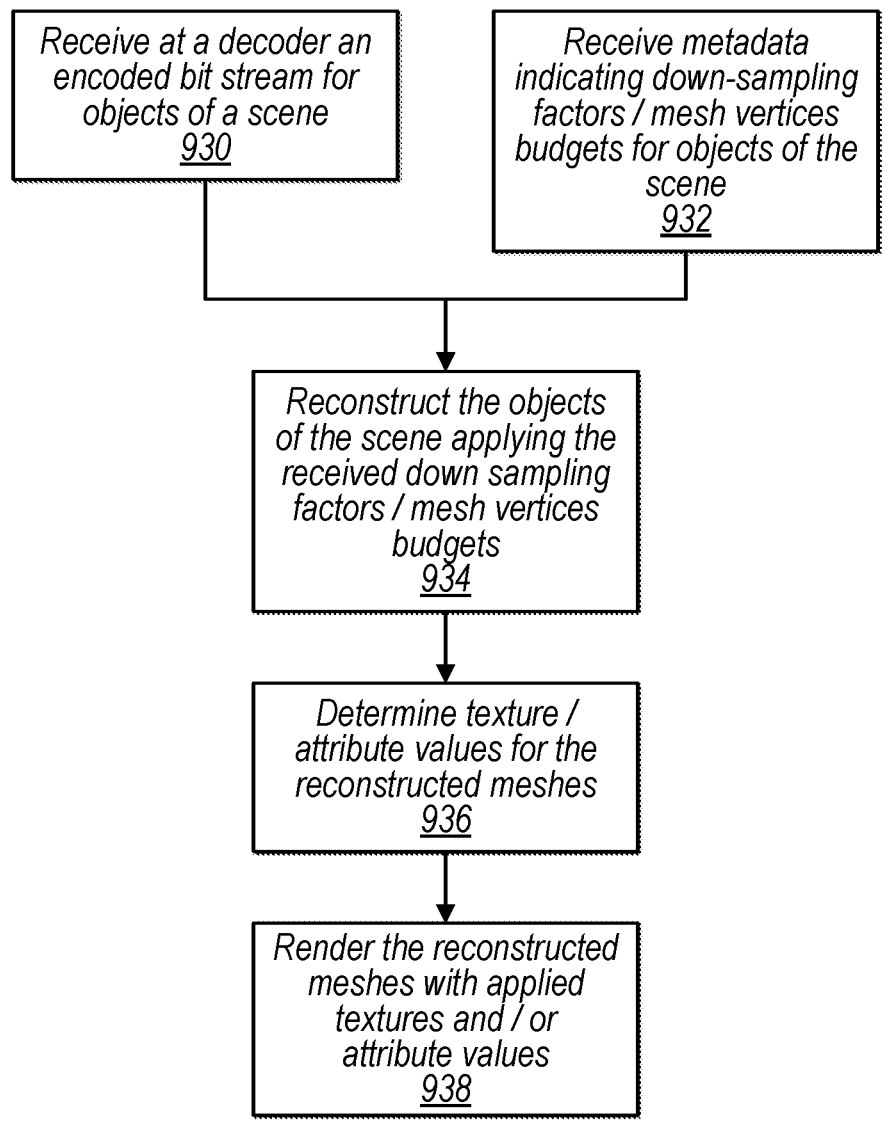
FIG. 9C illustrates a process of rendering a scene taking into account mesh vertices budgets for different objects in the scene located in different areas of the scene, according to some embodiments.

FIG. 9C illustrates a process of rendering a scene taking into account mesh vertices budgets for different objects in the scene located in different areas of the scene, according to some embodiments. In some embodiments, instead of applying the down-sampling factors/mesh vertices budgets at the server/encoder, the area definitions and down-sampling factors/mesh vertices budgets may be provided to a receiving device, such as a client device, renderer, decoder, etc., and may be applied during a reconstruction process for reconstructing the meshes representing the objects in the different areas of the scene.

At block 930, the receiving device (e.g. client device, renderer, decoder, etc.) receives an encoded bit stream for the scene comprising data defining an atlas and depth map that represent objects in the scene. Also, at 932, the receiving device (e.g. client device, renderer, decoder, etc.) receives metadata indicating down-sampling factors and/or mesh vertices budgets for objects of the scene. At block 934, the receiving device (e.g. client device, renderer, decoder, etc.) reconstructs the objects of the scene applying the received down sampling factors and/or mesh vertices budgets. For example, the receiving device (e.g. client device, renderer, decoder, etc.) may reduce a number of vertices to be rendered for the objects as compared to a number of vertices that would be rendered from the depth map without mesh simplification/down-sampling. Various techniques may be used to reduce the vertices for objects to be within the mesh vertices budget. For example, for a wall or open space the mesh vertices may be uniformly down-sampled to include a number of vertices within the mesh vertices budget for the object, e.g. the wall. At block 936, the receiving device (e.g. client device, renderer, decoder, etc.) determines texture/attribute values for the reconstructed meshes. At block 938, the receiving device (e.g. client device, renderer, decoder, etc.) renders the reconstructed meshes with the applied textures and/or attribute values.

Example Bit Stream Structure

Figure 10:
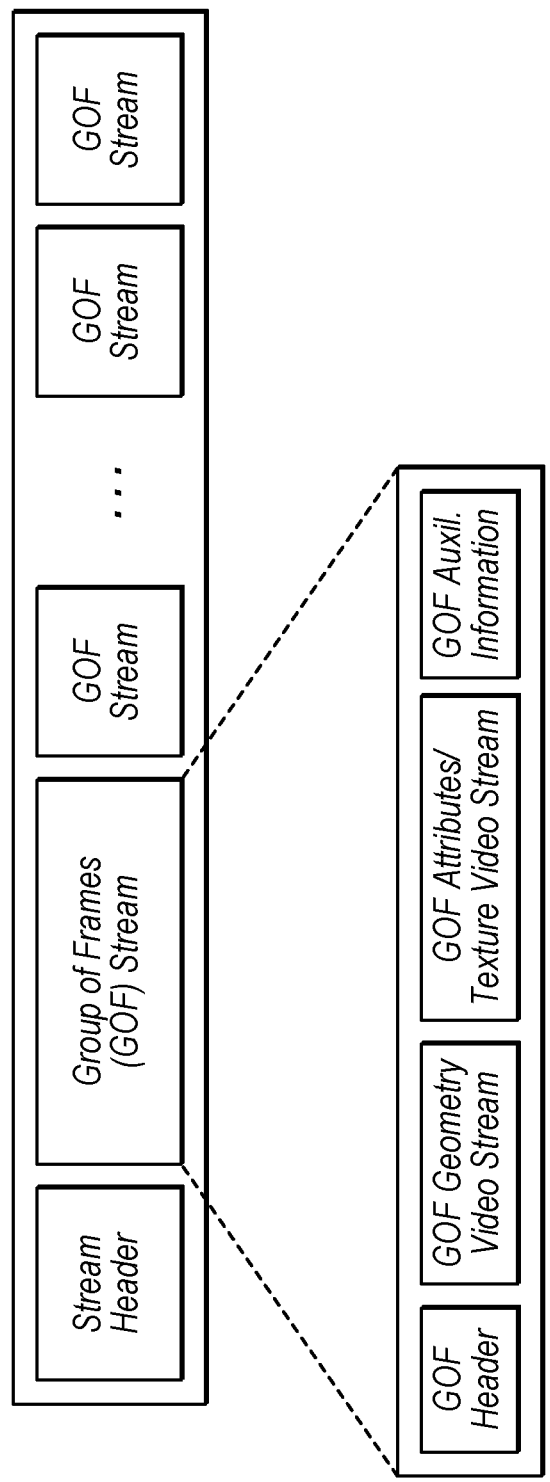
FIG. 10 illustrates, a bit stream structure for compressed volumetric content, according to some embodiments.

FIG. 10 illustrates, a bit stream structure for compressed volumetric content, according to some embodiments.

In some embodiments, relationship information for patch images in an image frame may be included in or derived from a bit stream. For example, FIG. 10 illustrates a bit stream structure for compressed volumetric content, such as scene 500 described above. In some embodiments, the auxiliary information may include relationship information for patch images (e.g. portions of an atlas and depth map corresponding to a same patch/view). Also, the auxiliary information may indicate which blocks of an image frame correspond to which patches. This information may be used to determine portions of an image frame that correspond to a same patch.

In some embodiments, metadata 820 as described in FIG. 8 may be signaled in a stream header, wherein area definitions and mesh vertices budgets apply to multiple groups of frames of a bit stream. Also, metadata 820 may be signaled in a group of frames header as shown in FIG. 10. While not shown in FIG. 10, metadata 820 may also be signaled in a group of pictures header. In some embodiments, metadata 820 may be signaled in a group of frames header and other metadata 820 that is specific to a portion of an area, such as sub-areas described in FIG. 7, may be signaled in the auxiliary information. For example a mesh vertices budget for the view area 3(506) may be signaled in a group of frames header for area 3 (506) and a separate mesh vertices budget for sub-area 3-1 (510) may be signaled in the auxiliary information. Wherein the separate mesh vertices budget is only applied to some of the frames that include patches corresponding to the sub-area 3-1 (510).

Example Computer System

Figure 11:
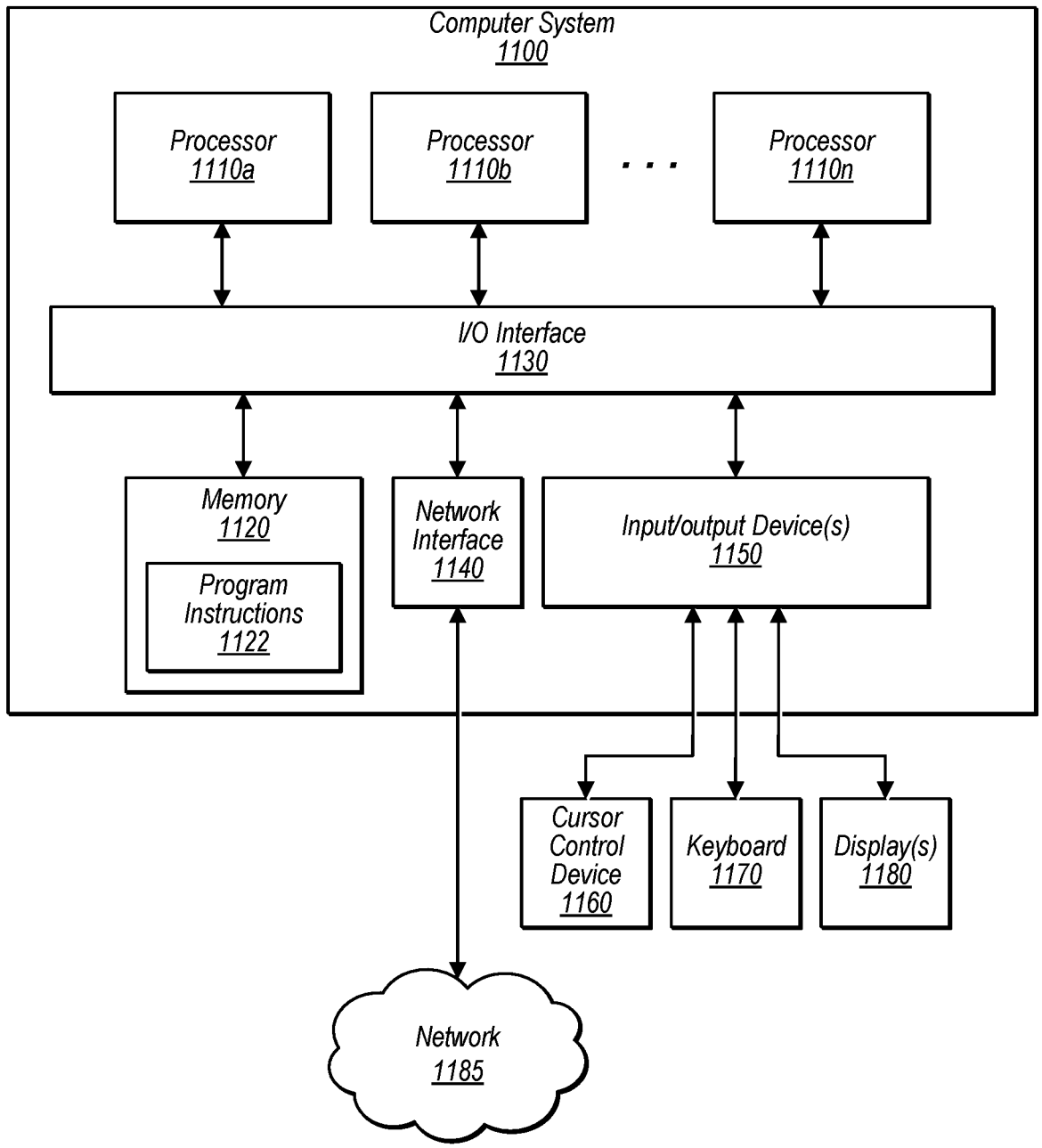
FIG. 11 illustrates an example computer system that may implement an encoder or decoder, according to some embodiments.

FIG. 11 illustrates an example computer system 1100 may implement an encoder or decoder or others of the components described herein, (e.g., any of the components described above with reference to FIGS. 1-10), in accordance with some embodiments. The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a wearable device such as a wrist watch or a wearable display, a peripheral device such as a switch, modem, router, or in general any type of computing or electronic device.

Various embodiments of an encoder or decoder, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments one or more of processors 1110 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1510 may include additional types of processors, such as graphics processing units (GPUs), application specific integrated circuits (ASICs), etc. In some embodiments, computer system 1500 may be implemented as a system on a chip (SoC). For example, in some embodiments, processors 1510, memory 1520, I/O interface 1530 (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture. In multiprocessor systems, each of processors 1110 may commonly, but not necessarily, implement the same ISA.

System memory 1120 may be configured to store compression or decompression program instructions 1122 and/or sensor data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement an encoder/decoder incorporating any of the functionality described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard, the Universal Serial Bus (USB) standard IEEE 1394 serial bus standard, etc., for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, tablets, wearable devices (e.g. head-mounted displays, virtual reality displays, augmented reality displays, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions, that when executed on or across one or more processors, cause the one or more processors to:
    identify areas of a three-dimensional scene based on objects included within the scene, wherein the areas are identified based on varying levels of geometric complexity of the objects included within the scene;
    determine, for each of the respective areas, a mesh vertices budget for objects included in the respective area, wherein a greater mesh vertices budget is allocated to one or more areas of the three-dimensional scene comprising more geometrically complex objects and a lesser mesh vertices budget is allocated to one or more other areas of the scene comprising less geometrically complex objects;
    generate metadata for the three-dimensional scene indicating:
        the identified areas of the three-dimensional scene; and
        respective mesh vertices budgets for each of the identified areas of the three-dimensional scene, wherein the mesh vertices budgets represent a number of vertices to be used to render objects within the respective areas or a down-scaling factor to be applied to reduce a number of vertices used to render objects within the respective areas;
    generate immersive video content for the three-dimensional scene;
    video-encode two-dimensional image frames comprising the generated immersive video content; and
    provide, to a recipient, the metadata with the video-encoded two-dimensional image frames.

2. The non-transitory computer-readable medium of claim 1, wherein the program instructions, when executed on or across the one or more processors, further cause the one or more processors to:
    identify objects in the three-dimensional scene;
    determine for the identified objects, an object type;
    assign respective object complexity values to the identified objects based on object type, wherein different complexity values are associated with different types of objects; wherein the identified areas of the scene are selected such that objects with similar complexity values are grouped together in common areas of the three-dimensional scene; and
    determine, for the identified areas of the three-dimensional scene, respective area complexity scores based on the assigned object complexity values of objects included in the respective areas of the three-dimensional scene, wherein the mesh vertices budgets for the objects included in the respective areas are determined based on the respective area complexity scores for the respective areas.

3. The non-transitory computer-readable medium of claim 2, wherein the program instructions, when executed on or across the one or more processors, further cause the one or more processors to:
    utilize a machine learning algorithm to identify the objects in the scene and/or determine the object types for the identified objects; or
    utilize a neural network algorithm to identify the objects in the scene and/or determine the object types for the identified objects.

4. The non-transitory computer-readable medium of claim 1, wherein the program instructions, when executed on or across the one or more processors, further cause the one or more processors to:
    reconstruct three-dimensional mesh representations of the objects included in the scene;
    determine, for respective objects included in the scene, object complexity values based on respective quantities of vertices required to reconstruct the three-dimensional mesh representations of the respective objects, wherein the identified areas of the scene are selected such that objects with similar complexity values are grouped together in common areas of the three-dimensional scene; and
    determine, for the identified areas of the three-dimensional scene, respective area complexity scores based on the assigned object complexity values of objects included in the respective areas of the three-dimensional scene, wherein the mesh vertices budgets for the objects included in the respective areas are determined based on the respective area complexity scores for the respective areas.

5. The non-transitory computer-readable medium of claim 1, wherein to provide the metadata with the video-encoded two-dimensional image frames, the program instructions, when executed on or across the one or more processors, further cause the one or more processors to:
include the metadata in a bit stream comprising an atlas comprising attribute information and a depth map for the three-dimensional scene.

6. The non-transitory computer-readable medium of claim 1, wherein the program instructions, when executed on or across the one or more processors, further cause the one or more processors to:
perform a rate distortion optimization analysis to determine a number of areas to identify in the three-dimensional scene, wherein the rate distortion optimization optimizes the number of areas to identify based on:
a data size of the metadata, wherein a larger number of areas results in a larger data size of the metadata and a smaller number of areas results in a smaller data size of the metadata;
grouping at least two objects, or object portions, with different object complexity values into a common area and determining for the common area:
an amount of distortion resulting from applying a first lower mesh vertices budget for rendering the at least two objects;
an amount of rendering overhead resulting from applying one or more higher mesh vertices budgets for rendering the least two objects; and
separating the at least two objects, or object portions, with different object complexity values into at least two separate areas and determining for each of the separate areas:
an amount of distortion reduction resulting from applying different mesh vertices budgets for the at least two objects, or object portions, having different complexity values; and
an amount of rendering overhead reduction resulting from applying different mesh vertices budgets for the at least two objects, or object portions, having different complexity values.

7. The non-transitory computer-readable medium of claim 1, wherein to generate the immersive video content for the three-dimensional scene, the program instructions, when executed on or across the one or more processors, further cause the one or more processors to:
generate one or more depth map images for the objects of the three-dimensional scene; and
generate one or more attribute atlas images for the objects of the three-dimensional scene;
wherein the video-encoded two-dimensional image frames comprise the one or more depth map images and the one or more attribute atlas images; and
wherein the metadata is included in a group of pictures header for the video-encoded two-dimensional image frames.

8. The non-transitory computer-readable medium of claim 1, wherein the three-dimensional scene is a dynamic scene, and wherein the program instructions, when executed on or across the one or more processors, further cause the one or more processors to:

for a first frame at a first moment in time:
generate one or more depth map images for the objects of the three-dimensional scene;
generate one or more attribute atlas images for the objects of the three-dimensional scene;
video-encode two-dimensional image frames comprising the one or more depth map images and the one or more attribute atlas images; and
for one or more subsequent frames at one or more subsequent moments in time:
generate one or more depth map images for the objects of the three-dimensional scene;
generate one or more attribute atlas images for the objects of the three-dimensional scene;
video-encode additional two-dimensional image frames comprising the one or more depth map images and the one or more attribute atlas images for the one or more subsequent moments in time; and
include the metadata in a group of frames header for the frames of the dynamic scene comprising video-encoded two-dimensional image frames for the first moment in time and the one or more subsequent moments in time.

9. The non-transitory computer-readable medium of claim 8, wherein the program instructions, when executed on or across the one or more processors, further cause the one or more processors to:
determine respective sizes of the identified areas based on motion of the objects included in the respective areas, wherein the area sizes are selected such that the objects included in the respective areas remain in the respective areas as the dynamic scene changes from the first moment in time through the one or more subsequent moments in time.

10. The non-transitory computer-readable medium of claim 1, wherein to perform said providing of the metadata with the video-encoded two-dimensional image frames, the program instructions, when executed on or across the one or more processors, further cause the one or more processors to:
provide the generated metadata to a server, wherein the server applies downscaling factors to the objects included in the respective area to reduce respective complexities of the objects to be within the determined mesh vertices budgets.

11. The non-transitory computer-readable medium of claim 1, wherein to perform said providing of the metadata with the video-encoded two-dimensional image frames, the program instructions, when executed on or across the one or more processors, further cause the one or more processors to:
provide the generated metadata to a rendering client, wherein the rendering client applies downscaling factors to the objects included in the respective areas to reduce respective complexities of the objects to be within the determined mesh vertices budgets.

12. A device, comprising:
a memory storing program instructions; and
one or more processors, wherein the one or more processors are configured to execute the program instructions to:
receive a bit stream comprising:
encoded information for objects of a three-dimensional scene, the encoded information comprising video-encoded two-dimensional image frames comprising immersive video content for the objects of the three-dimensional scene; and metadata for the three-dimensional scene, the metadata indicating:
  areas of the three-dimensional scene; and
  respective mesh vertices budgets for respective ones of the areas of the three-dimensional scene, wherein the mesh vertices budgets represent a number of vertices to be used to render objects within the respective areas or a down-scaling factor to be applied to reduce a number of vertices used to render objects within the respective areas;
apply the mesh vertices budgets to the objects included in the respective areas to reduce respective numbers of vertices to be used to render the objects included in the respective areas; and
reconstruct the objects of the three-dimensional scene using the reduced respective numbers of vertices to render the objects as indicated in the metadata.

13. The device of claim 12, wherein the bit stream comprises:
  a group of frames header, wherein the metadata for the three-dimensional scene is indicated in the group of frames header; and
  encoded information for a plurality of moment-in-time frames of the three-dimensional scene representing the objects of the three-dimensional scene at a plurality of moments in time;
  wherein the program instructions further cause the one or more processors to:
    cache the metadata included in the group of frames header; and
    apply the mesh vertices budgets to the objects included in the respective areas for the plurality of moment-in-time frames of the three-dimensional scene to reduce respective numbers of vertices to be used to render the objects included in the respective areas for the plurality of moment-in-time frames; and
    reconstruct the three-dimensional scene at the plurality of moments in time corresponding to the plurality of moment-in-time frames using the reduced respective numbers of vertices to render the objects as indicated in the metadata of the group of frames header.

14. The device of claim 12, wherein the program instructions further cause the one or more processors to:
  determine a quantity of device resources available to reconstruct the objects of the three-dimensional scene; and
  determine whether or not to apply the mesh vertices budgets to the objects included in the respective areas to reduce respective numbers of vertices to be used to render the objects included in the respective areas based on the quantity of device resources available to reconstruct the objects of the three-dimensional scene.

15. A system, comprising:
one or more computing devices configured to:
  identify areas of a three-dimensional scene based on objects included within the scene, wherein the areas are identified based on varying levels of geometric complexity of the objects included within the scene;
  determine, for each of the respective areas, a mesh vertices budget for objects included in the respective area, wherein a greater mesh vertices budget is allocated to one or more areas of the three-dimensional scene comprising more geometrically complex objects and a lesser mesh vertices budget is allocated to one or more other areas of the scene comprising less geometrically complex objects;
  generate metadata for the three-dimensional scene indicating:
    the identified areas of the three-dimensional scene; and
    respective mesh vertices budgets for the respective ones of the identified areas of the three-dimensional scene, wherein the mesh vertices budgets represent a number of vertices to be used to render objects within the respective areas or a down-scaling factor to be applied to reduce a number of vertices used to render objects within the respective areas;
  generate immersive video content for the three-dimensional scene; video-encode two-dimensional image frames comprising the generated immersive video content; and
  provide, to a recipient, the metadata with the video-encoded two-dimensional image frames.

16. The system of claim 15, wherein to generate the immersive video content for the three-dimensional scene and video-encode the two-dimensional image frames comprising the generated immersive video content, the one or more computing devices are further configured to:
  encode representations of the objects included in the three-dimensional scene, wherein to encode the representations the one or more computing devices are further configured to:
    generate one or more depth map images representing the objects of the three-dimensional scene;
    generate one or more attribute atlas images representing the objects of the three-dimensional scene; and
    video-encode two-dimensional image frames comprising the one or more depth map images and the one or more attribute atlas images.

17. The system of claim 16, wherein to provide the metadata with the video-encoded two-dimensional image frames, the one or more computing devices are further configured to:
  provide a bit stream for use by a rendering client to render the three-dimensional scene, wherein the encoded bit stream comprises the encoded two-dimensional image frames and the metadata indicating respective mesh vertices budgets for respective ones of the identified areas of the three-dimensional scene.

18. The system of claim 15, wherein the one or more computing devices are further configured to:
  generate one or more mesh representations of the objects of the three-dimensional scene;
  down-sample the mesh representations of the objects within the respective areas based on the respective mesh vertices budgets for each of the identified areas;
  encode the down-sampled mesh representations of the objects; and
  provide the encoded down-sampled representations of the objects for use by a rendering client to render the three-dimensional scene.

19. The system of claim 15, wherein the one or more computing devices are further configured to:
  identify objects in the three-dimensional scene;
  determine, for the identified objects, an object type;
  assign respective object complexity values to the identified objects based on the determined object types, wherein different complexity values are associated with different types of objects; wherein the identified areas of the scene are selected such that objects with similar complexity values are grouped together in common areas of the three-dimensional scene; and determine, for the identified areas of the three-dimensional scene, respective area complexity scores based on the assigned object complexity values of objects included in the respective areas of the three-dimensional scene, wherein the mesh vertices budgets for the objects included in the respective areas are determined based on the respective area complexity scores for the respective areas.

20. The system of claim 15, wherein the one or more computing devices are further configured to:
   reconstruct three-dimensional mesh representations of the objects included in the three-dimensional scene;
   determine, for respective objects included in the scene, object complexity values based on respective quantities of vertices required to reconstruct the three-dimensional mesh representations of the respective objects, wherein the identified areas of the scene are selected such that objects with similar complexity values are grouped together in common areas of the three-dimensional scene; and
   determine, for the identified areas of the three-dimensional scene, respective area complexity scores based on the assigned object complexity values of objects included in the respective areas of the three-dimensional scene, wherein the mesh vertices budgets for the objects included in the respective areas are determined based on the respective area complexity scores for the respective areas.

* * * * *